(No Model.)
T. McSPEDON.
METHOD OF AND APPARATUS FOR TESTING METERS.
No. 261,943. Patented Aug. 1, 1882.
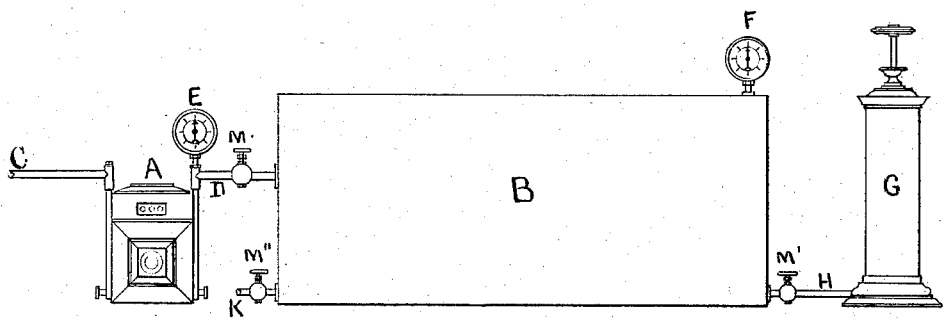
WITNESSES:
INVENTOR: Thomas McSpedon
BY David A. Burr
ATTORNEY.

UNITED STATES PATENT OFFICE.

THOMAS McSPEDON, OF NEW YORK, N. Y.

METHOD OF AND APPARATUS FOR TESTING METERS.

SPECIFICATION forming part of Letters Patent No. 261,943, dated August 1, 1882.

Application filed October 14, 1881. (No model.)

*To all whom it may concern:*

Be it known that I, THOMAS MCSPEDON, of the city, county, and State of New York, have invented certain new and useful Improvements in Method of and Apparatus for Testing Fluid Meters; and I do hereby declare that the following is a full, clear, and exact description thereof, reference being had to the accompanying drawing, and to the letters of reference marked thereon, making a part of this specification.

My invention is designed more especially for testing gas-meters; but it is applicable also to water-meters; and it relates to the testing of the meter by obtaining an exact measurement in a standard tank or vessel of the quantity of gas or fluid delivered from the instrument and registered thereby.

It consists in a novel method of effecting simply and absolutely a measurement of a given volume of the gas or water delivered from the meter and indicated by its register by exhausting the contents of a tank or vessel whose exact cubical contents have been accurately determined, and, after noting the reading of the index of the meter, filling the exhausted tank from the meter. So soon as the pressure at the meter and in the tank becomes fully equalized, as indicated by accurate gages on the one and the other, a second reading of the index is taken. If the meter registers with accuracy, its index will denote a flow through it in the process of filling the tank exactly equivalent to the cubical contents of said tank. Any variation therefrom will prove and indicate a defect in the working of the meter and exhibit its inaccuracy.

The object of my invention is to provide an accurate, simple method and device for testing a meter in use without detaching it from the main or service pipe with which it may be connected.

In the accompanying drawing, A is a gas-meter of the usual form; B, a strong, light, and portable air-tight tank of such dimensions as that its cubical contents shall be the exact equivalent of a given number of units noted upon the index of the meter—viz., in cubic feet in the case of a gas-meter—and in gallons in the case of a water-meter. C is a supply-pipe connected with the inlet to the meter; D, a pipe closed by a valve, M, by which communication is established between the outlet of the meter A and the measuring-tank B; E, a pressure-gage placed immediately at the outlet of the meter; F, a second pressure-gage, connected with the tank; G, an air-pump, and H a pipe governed by a valve, M', and which connects the pump with the tank; K, a drip and discharge pipe, placed at bottom of the tank and fitted with a valve, $M^2$.

In the use of the apparatus, the proper connections of the measuring-tank B and the pressure-gage E being made to the meter, the valve M is closed, and the air contained in the tank M is closed, and the air contained in the tank fully exhausted therefrom by the use of the air-pump G. So soon as this is accomplished the valve M' in the pipe H, leading to the air-pump, is closed, and the gas being turned on at the meter a reading of its index is taken and the valve M opened. The tank B will thereupon immediately fill with gas, its flow being indicated by the meter and noted by its index. So soon as the pressure in the measuring-tank, as indicated by its gage F, is equal to that in the meter, as indicated by the gage E, showing that the tank is completely filled, the valve M is closed, and a second reading of the meter now taken. The exact amount of gas delivered through the meter into the tank being known, a standard is afforded by means whereof the accuracy of the index is tested, and if the index should, under the conditions set forth, not indicate truly the amount of gas measured in the tank, its inaccuracy in either direction is at once detected and made apparent.

In using my measuring-tank and gage for testing a meter for water or other fluids heavier than air, the air-pump is not essential in view of the fact that the water may in itself be used to force out the air from the tank without admixing therewith, an air vent or cock being in such case provided in the top of the tank to permit an escape of the air.

I am aware that an apparatus has heretofore been employed for testing meters in which the contents of a holder containing a certain determinate number of cubic feet are passed through the meter to determine the accuracy of its registering devices; but the use of such an apparatus requires that the meter shall be disconnected from the service-pipe, and it cannot be used for testing meters which, having been put in by gas and water companies for their customers, cannot be disconnected unless by order of the company. My invention is desiged to test meters in use, or which are connected with a suitable supply pipe.

What I claim as new, and desire to secure by Letters Patent, is—

1. The method, substantially as herein described, of testing the accuracy of meters connected to a supply-main without detaching them from the main by filling a closed tank from which the air has been exhausted, and whose capacity is determined in units of the same denomination as that of the meter, with fluid delivered from the meter by means of the pressure in the main until an equilibrium of pressure has been established at the meter and in the tank, and then comparing the known measurement of the tank with the quantity indicated by the index as having been delivered through the meter.

2. The combination, with the delivery-port of a meter and with a supply-main connected to its induction-port, of a fixed closed measuring-tank of determinate capacity connected to its eduction-port, substantially in the manner and for the purpose herein set forth.

3. The combination, with a fluid meter and its supply-pipe, of a measuring-tank connected with the outlet from the meter, a cut-off valve controlling said outlet, and an air-pump for exhausting the air from the tank, substantially in the manner and for the purpose herein set forth.

In testimony whereof I have signed my name to this specification in the presence of two subscribing witnesses.

THOMAS McSPEDON.

Witnesses:
J. F. ACKER, Jr.,
GEO. H. BRANDON.